(12) United States Patent
Kusukawa et al.

(10) Patent No.: US 8,472,135 B1
(45) Date of Patent: Jun. 25, 2013

(54) MICROWAVE-ASSISTED MAGNETIC RECORDING HEAD HAVING A CURRENT CONFINEMENT STRUCTURE

(75) Inventors: Kikuo Kusukawa, Yoshikawa (JP);
Masato Shiimoto, Odawara (JP);
Kazuhiko Hosomi, Fujisawa (JP);
Katsuro Watanabe, Hitachi-ohta (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/416,784

(22) Filed: Mar. 9, 2012

(51) Int. Cl.
*G11B 5/127* (2006.01)

(52) U.S. Cl.
USPC .......................................................... 360/110

(58) Field of Classification Search
USPC ................ 360/110, 234.3, 324, 245.3, 234.6, 360/236.5
See application file for complete search history.

(56) References Cited

U.S. PATENT DOCUMENTS

| | | | |
|---|---|---|---|
| 7,580,227 B2 | 8/2009 | Sato et al. | |
| 2008/0304176 A1 | 12/2008 | Takagishi et al. | |
| 2009/0059423 A1 | 3/2009 | Yamada et al. | |
| 2009/0080120 A1 | 3/2009 | Funayama et al. | |
| 2010/0007996 A1 | 1/2010 | Iwasaki et al. | |
| 2010/0027158 A1 | 2/2010 | Takagishi et al. | |
| 2010/0214692 A1 | 8/2010 | Kief et al. | |
| 2010/0309577 A1 | 12/2010 | Gao et al. | |
| 2011/0090603 A1 | 4/2011 | Bai | |
| 2012/0206837 A1* | 8/2012 | Fuji et al. | 360/254 |

FOREIGN PATENT DOCUMENTS

| | | |
|---|---|---|
| JP | 2010/003367 A | 1/2010 |
| JP | 2010/080024 A | 4/2010 |
| WO | 2010/016296 A1 | 2/2010 |
| WO | 2010/053187 A1 | 5/2010 |

* cited by examiner

*Primary Examiner* — Allen T Cao
(74) *Attorney, Agent, or Firm* — Zilka-Kotab, PC

(57) ABSTRACT

According to one embodiment, a high-frequency magnetic field-assisted magnetic recording head includes a main pole adapted for producing a writing magnetic field, a STO positioned above the main pole, a low-resistance layer positioned above the STO, and a current confinement layer positioned between the low-resistance layer and the main pole, wherein the main pole and the low-resistance layer are adapted for acting as poles for writing data to a magnetic medium in response to a flow of current to the STO positioned therebetween to generate a high-frequency magnetic field which overlaps with the writing magnetic field, and wherein the current confinement layer is adapted for controlling a current density and/or a current density distribution of the current flowing to the STO. Other magnetic recording heads and methods of production thereof are also described according to more embodiments.

22 Claims, 16 Drawing Sheets

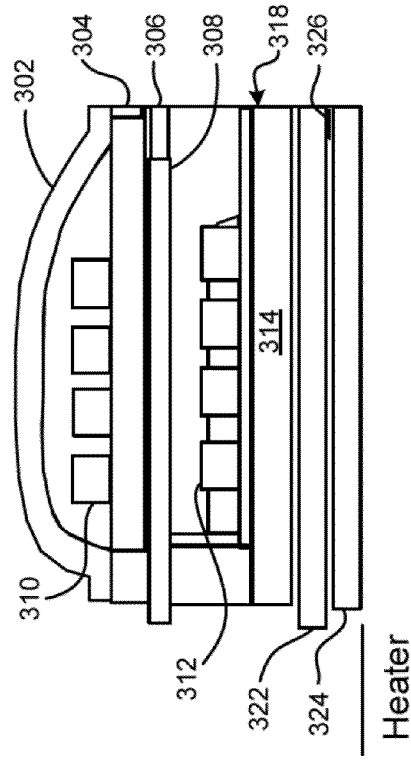
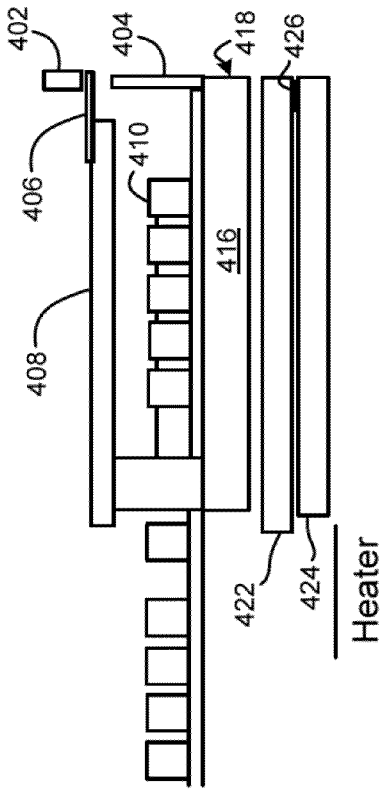
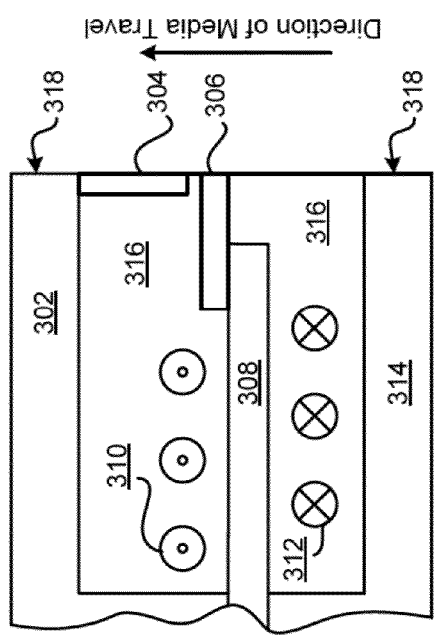
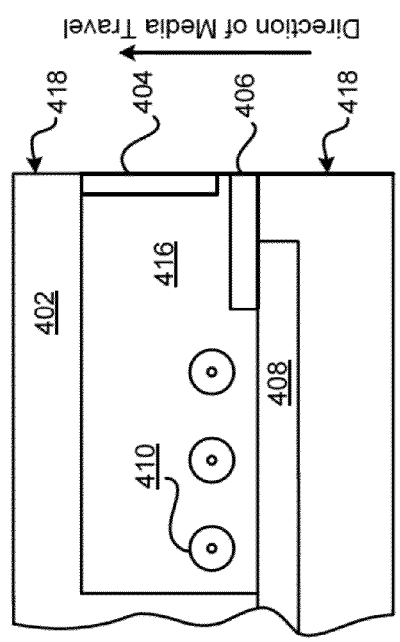

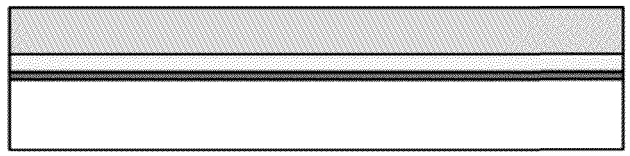 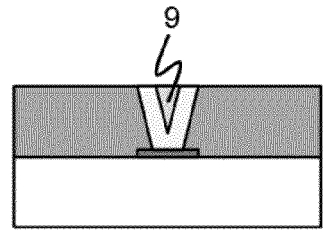
FIG. 9E
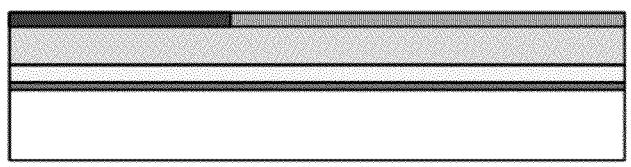 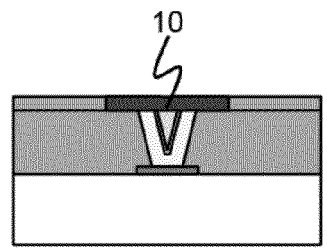
FIG. 9F
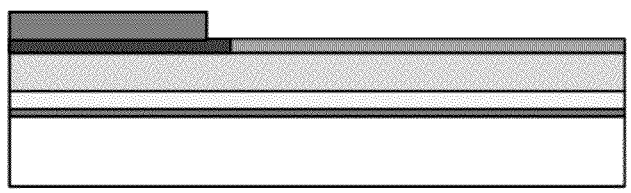 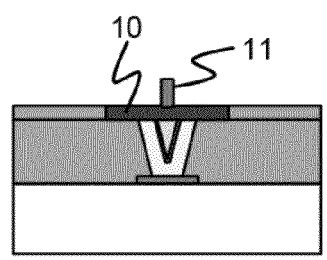
FIG. 9G
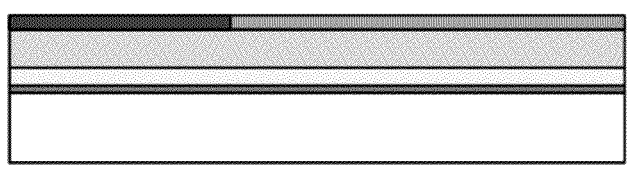 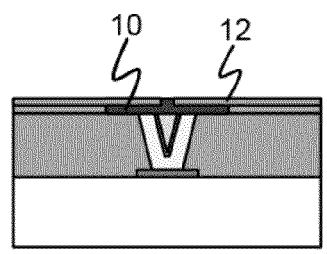
FIG. 9H

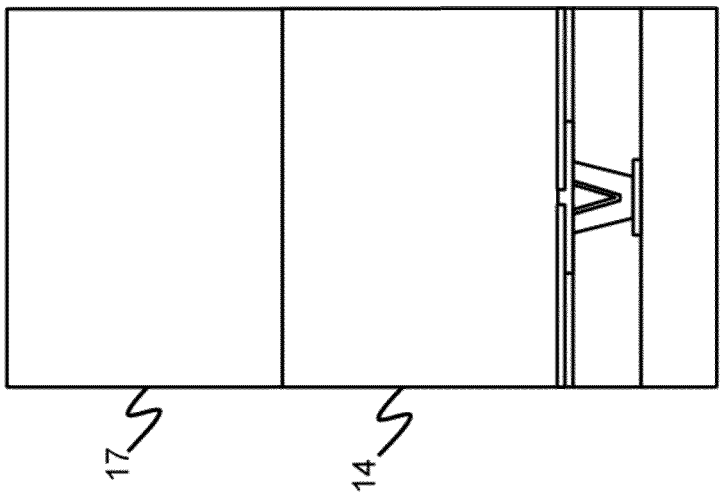
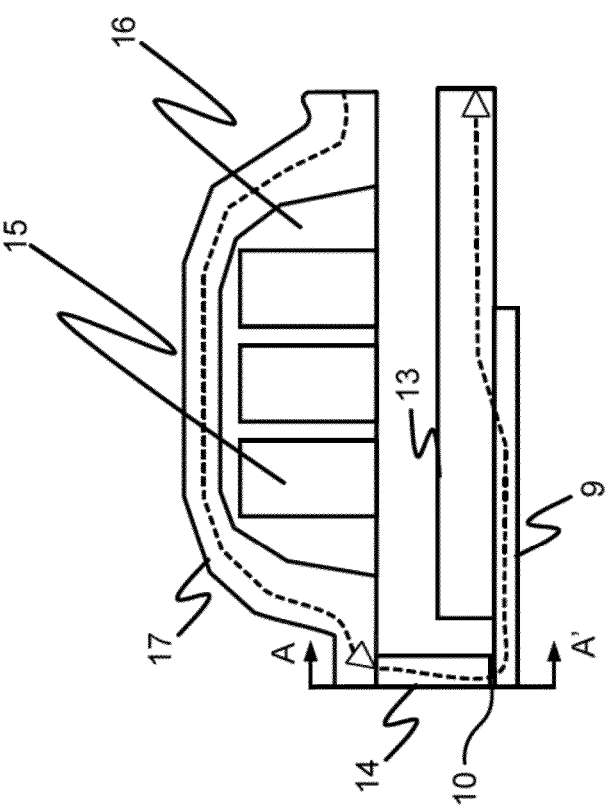
FIG. 9I

MICROWAVE-ASSISTED MAGNETIC RECORDING HEAD HAVING A CURRENT CONFINEMENT STRUCTURE

FIELD OF THE INVENTION

The present invention relates to magnetic recording heads, and more particularly, to a microwave-assisted magnetic recording head having a current confinement structure.

BACKGROUND

One method to achieve higher recording density using a magnetic head mounted in a hard disk device is to narrow the pitch and/or the bits of the track that are written to the magnetic recording medium (e.g., the hard disk). Referring to FIG. 5A which shows a conventional magnetic write head having a main pole 9, a side gap 8, side shields 7, a trailing gap 18, a trailing shield 14, and a high Bs (saturation magnetic flux density) trailing shield area 19, as a result of narrowing either of the pitch and/or the bits of the track, the area of the main pole 9 on the air-bearing surface (ABS) decreases remarkably, with an accompanying increase in the recording density. The magnetic field generated from the main pole 9 is also reduced in accordance with the narrowing width of the main pole 9 and, in turn, the magnetic recording field required for writing data to the magnetic medium is not able to be produced.

As a countermeasure for this eventuality, as shown in FIG. 5B according to the prior art, a high-frequency magnetic field assisted recording system which performs recording by applying a high-frequency magnetic field to a recording medium to reduce the switching field of the medium and, in this state, applying a recording magnetic field to the medium has been used. One such recording system is a microwave-assisted magnetic recording (MAMR) system. The MAMR head includes a main pole 9, a spin torque oscillator (STO) 10, and a trailing shield 14.

The oscillation properties in a MAMR head are produced through use of the drive of the STO 10 which uses a high current density in order to achieve the necessary assistance. In order to match the position of the magnetic field and the magnetic field-assisted head, the size of the STO 10 is less than the size of the main pole 9, and it is disposed directly above and in contact with the main pole 10.

As shown in FIG. 6A according to the prior art, for a bit density of, for example, 1 Tb/in$^2$, the geometric track width $t_2$ of the main pole 9 is about 45 nm, while the width of the STO 10 correspondent thereto is even smaller, with a geometric track width $t_1$ of about 40 nm. In existing pattern alignment technology, as shown in FIG. 6B according to the prior art, the alignment of a STO 10 at a center of a main pole 9 that is created in an acceptably-high yield process has proved problematic using conventional systems and methods. When misalignment occurs, it affects both the switching field reduction effect on the recording medium and the write width on the recording medium which, in turn, precludes achieving the desired write performance and recording track width. As seen, the high-frequency magnetic field 10e produced by the STO 10 overlaps with the magnetic field 9e produced by the main pole 9 in order for the effects of the STO 10 to enhance writing. Effective writing width $t_3$ is narrower than preferred when misalignment between the main pole 9 and the STO 10 occurs which causes the overlap width to decrease.

Accordingly, it would beneficial to have a magnetic recording system and/or method utilizing MAMR that overcomes these problems.

SUMMARY

In one embodiment, a MAMR head includes a main pole adapted for producing a writing magnetic field, a STO positioned above the main pole, a low-resistance layer positioned above the STO, and a current confinement layer positioned between the low-resistance layer and the main pole, wherein the main pole and the low-resistance layer are adapted for acting as poles for writing data to a magnetic medium in response to a flow of current to the STO positioned therebetween to generate a high-frequency magnetic field which overlaps with the writing magnetic field, and wherein the current confinement layer is adapted for controlling a current density and/or a current density distribution of the current flowing to the STO.

According to another embodiment, a MAMR head includes a main pole adapted for producing a writing magnetic field, a STO positioned above the main pole, a trailing shield positioned above the STO, wherein the trailing shield includes a low-resistance layer, and a current confinement layer positioned between the trailing shield and the main pole, wherein the main pole and the low-resistance layer of the trailing shield are adapted for acting as poles for writing data to a magnetic medium in response to a flow of current to the STO positioned therebetween to generate a high-frequency magnetic field which overlaps with the writing magnetic field, and wherein the current confinement layer is adapted for controlling a current density and/or a current density distribution of the current flowing to the STO.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 3A is a cross-sectional view of one particular embodiment of a perpendicular magnetic write head with helical coils.

FIG. 3B is a cross-sectional view of one particular embodiment of a piggyback magnetic head with helical coils.

FIG. 4A is a cross-sectional view of one particular embodiment of a perpendicular magnetic write head with pancake coils.

FIG. 4B is a cross-sectional view of one particular embodiment of a piggyback magnetic head with pancake coils.

FIGS. 9A-9I show a manufacturing process for forming a MAMR head, according to various embodiments.

DETAILED DESCRIPTION

Figure 1:
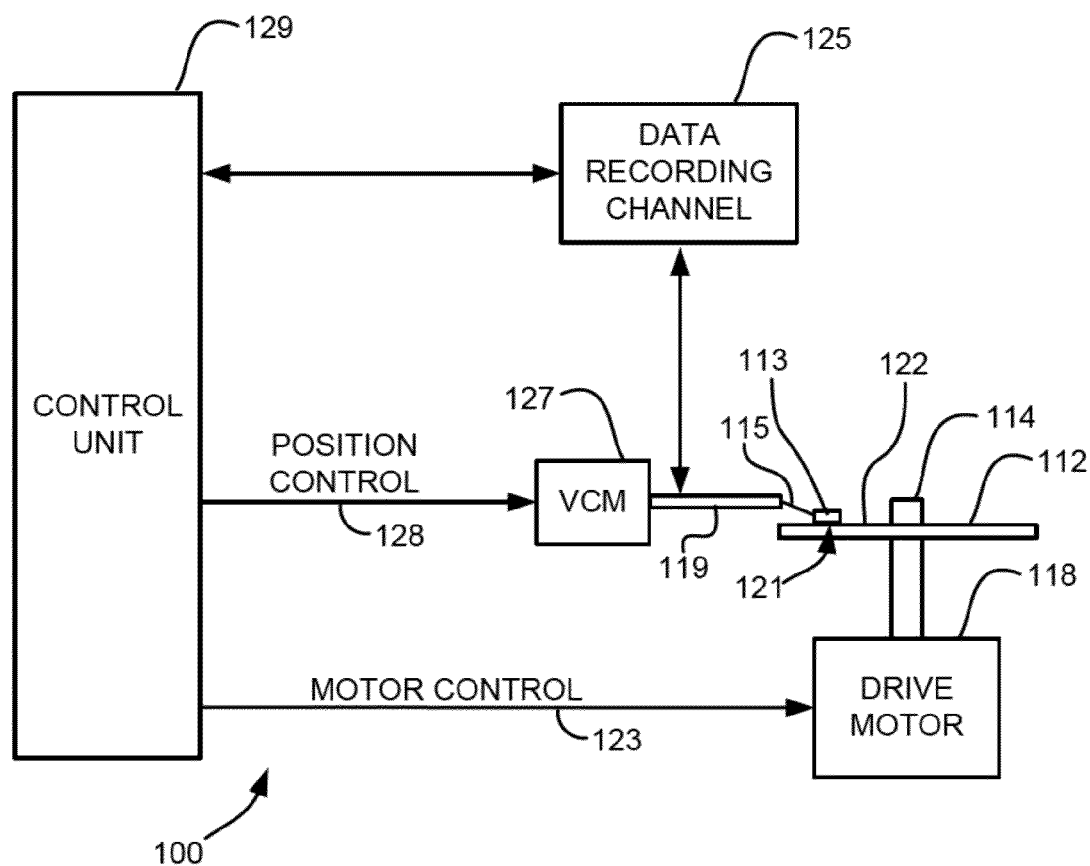
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

The following descriptions provide examples and embodiments of high-frequency magnetic field assisted recording heads, which may be used for recording data to magnetic media. The high-frequency magnetic assisting field may be provided in any suitable frequency range, such as high-frequency (HF: 3-30 MHz), very high frequency (VHF: 30-300 MHz), ultra high frequency (UHF: 300-3000 MHz), super high frequency (SHF: 3-30 GHz), extremely high frequency (EHF: 30-300 GHz), terahertz (THz: 300-3000 GHz), or any combination thereof. In addition, the high-frequency magnetic assisting field may be produced by a spin-torque oscillator (STO) or some other suitable component, as known in the art. The STO may be included in a microwave-assisted magnetic recording (MAMR) element. In some embodiments, the STO may produce a magnetic field at a frequency of between about 300 MHz and about 300 GHz. Of course, any other suitable element as known in the art may be used instead of a MAMR element. However, for the sake of simplicity, the descriptions provided herein will describe a magnetic head using a MAMR element, but any other suitable element may be used in place of or with a MAMR element.

According to various embodiments, a magnetic recording head that facilitates stable high-frequency magnetic field assisted recording, such as microwave-assisted magnetic recording (MAMR), and is capable of being produced with an acceptable yield in a manufacturing process is presented. Furthermore, magnetic recording devices employing the head structure are also described in more embodiments. More particularly, in some embodiments, a high-frequency magnetic field assisted recording structure that is generally unaffected by the alignment accuracy (or inaccuracy) between the main pole and the spin torque oscillator (STO) is capable of being produced with an acceptably high yield in a manufacturing process.

In one general embodiment, a MAMR head includes a main pole adapted for producing a writing magnetic field, a STO positioned above the main pole, a low-resistance layer positioned above the STO, and a current confinement layer positioned between the low-resistance layer and the main pole, wherein the main pole and the low-resistance layer are adapted for acting as poles for writing data to a magnetic medium in response to a flow of current to the STO positioned therebetween to generate a high-frequency magnetic field which overlaps with the writing magnetic field, and wherein the current confinement layer is adapted for controlling a current density and/or a current density distribution of the current flowing to the STO.

According to another general embodiment, a MAMR head includes a main pole adapted for producing a writing magnetic field, a STO positioned above the main pole, a trailing shield positioned above the STO, wherein the trailing shield includes a low-resistance layer, and a current confinement layer positioned between the trailing shield and the main pole, wherein the main pole and the low-resistance layer of the trailing shield are adapted for acting as poles for writing data to a magnetic medium in response to a flow of current to the STO positioned therebetween to generate a high-frequency magnetic field which overlaps with the writing magnetic field, and wherein the current confinement layer is adapted for controlling a current density and/or a current density distribution of the current flowing to the STO.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 using a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 that exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion that extends from the ABS to a flare point and a yoke portion that extends from the flare point to the back gap. The flare point is where the second pole piece begins to widen (flare) to form the yoke. The placement of the flare point directly affects the magnitude of the magnetic field produced to write information on the recording medium.

According to one illustrative embodiment, a magnetic data storage system may comprise at least one magnetic head as described herein according to any embodiment, a magnetic medium, a drive mechanism for passing the magnetic medium over the at least one magnetic head, and a controller electrically coupled to the at least one magnetic head for controlling operation of the at least one magnetic head.

Figure 2A:
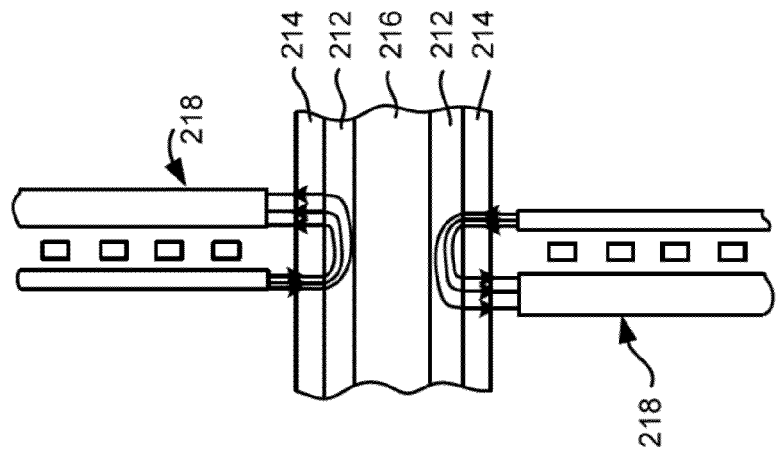
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic signals in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
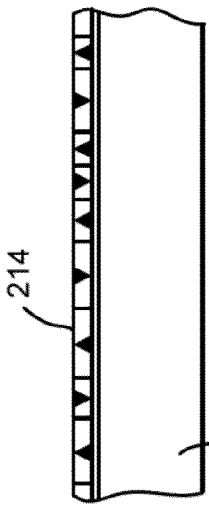
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
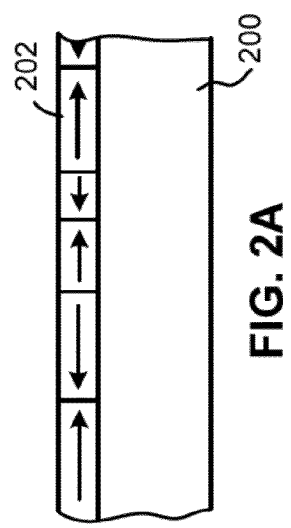
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
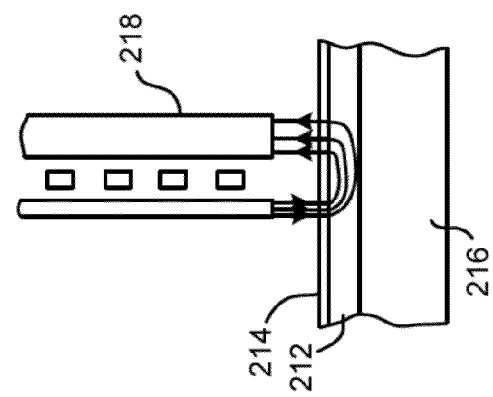
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown above a suitable substrate 216. Typically, there is also an additional layer (not shown) called an "exchange-break" layer or "intermediate layer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic signals having their axes substantially perpendicular to the surface of the medium. The flux is channeled by the soft underlying coating 212 back to the return layer (P1) of the head 218.

Figure 2E:
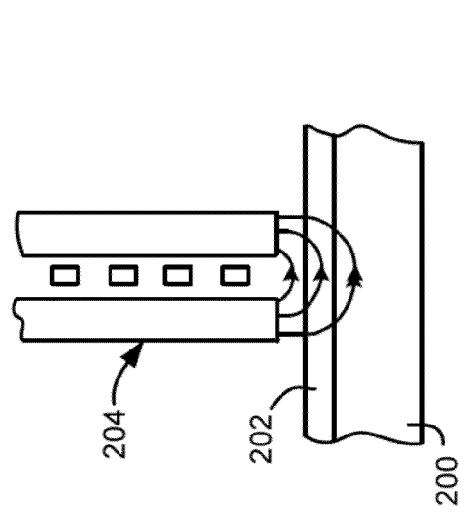
FIG. 2E is a schematic representation of a recording apparatus adapted for recording separately on both sides of the medium.
Figure 5A:
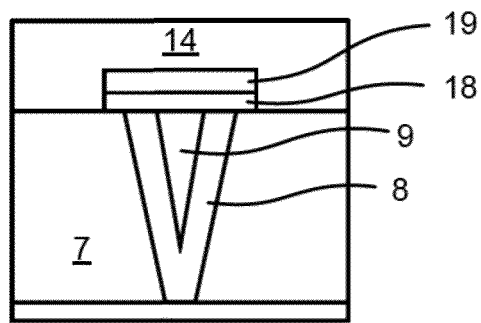
FIG. 5A shows a conventional perpendicular magnetic write head, according to the prior art.
Figure 5B:
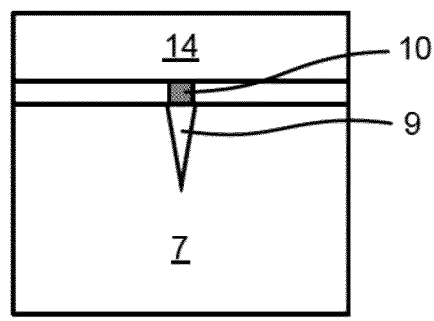
FIG. 5B shows a conventional microwave-assisted magnetic recording (MAMR) head, according to the prior art.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment that uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 that may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. The heater element may be used, according to some embodiments, to cause protrusion of portions of the head for thermal fly-height control (TFC). A heater element (Heater) may also be included in the magnetic heads shown in FIGS. 3A and 4A. The position of this heater may vary based on design parameters such as where the protrusion is desired, coefficients of thermal expansion of the surrounding layers, etc.

Figure 7A:
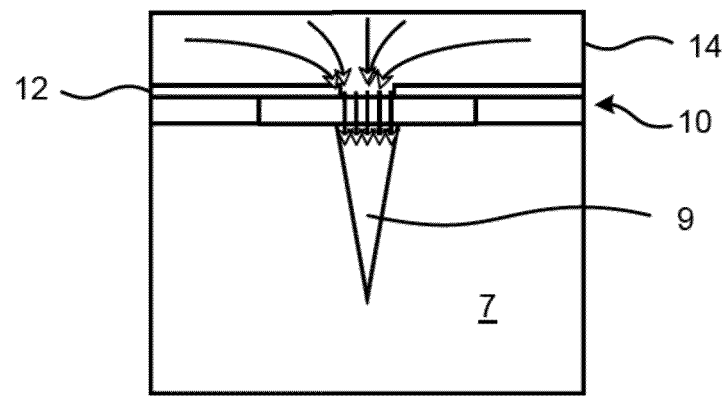
FIGS. 7A-7B show a MAMR head having a current confinement layer, according to one embodiment.
Figure 7B:
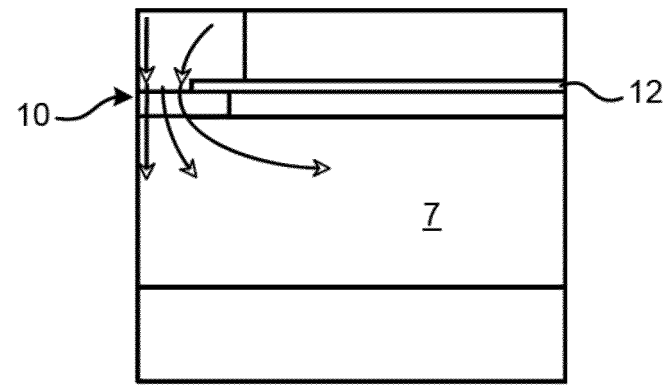

According to one embodiment, as shown in FIGS. 7A-7B, in order to resolve the problems of the prior art, a MAMR system is shown which comprises an oscillation device 10 (e.g., a STO) for generating a high-frequency magnetic field for promoting the magnetization switching of a magnetic recording medium, a main pole 9 and a trailing shield 14 for writing data to the magnetic medium, and a current confinement layer 12 for regulating a current path of the oscillation device 10 to control the oscillation width. The width of the STO 10 is formed larger than the width of the main pole 9, and a current confinement layer 12 is provided between the trailing shield 14 and the main pole 9, such as at an interface between the STO 10 and the trailing shield 14. An aperture (e.g., a slit, an opening, a hole, a tunnel, etc.) through which the STO 10 and trailing shield 14 are in electrical conduction is provided in the current confinement layer 12, according to one embodiment.

In one embodiment, a width of the aperture provided in the current confinement layer 12 may be narrower than a width of the STO 10, and may be equivalent to or less than a width of the main pole 9. In addition, the height of the current confinement layer 12 from the media-facing surface (such as an ABS, in one example) may be less than a height of the trailing shield 14.

In a MAMR head, according to one embodiment, when a voltage is applied to the main pole 9 and the trailing shield 14, a current density distribution is generated in the STO 10 by providing an aperture, which has an appropriate width and height, in the current confinement layer 12. By virtue of the fact that current density produced in the STO 10, relegated to two regions, where magnetization oscillation is generated and where it is not generated, are provided in the wide region of the STO 10. That is, in the higher region, current density magnetization oscillation is generated, and in the lower region, it is not generated.

Figure 6A:
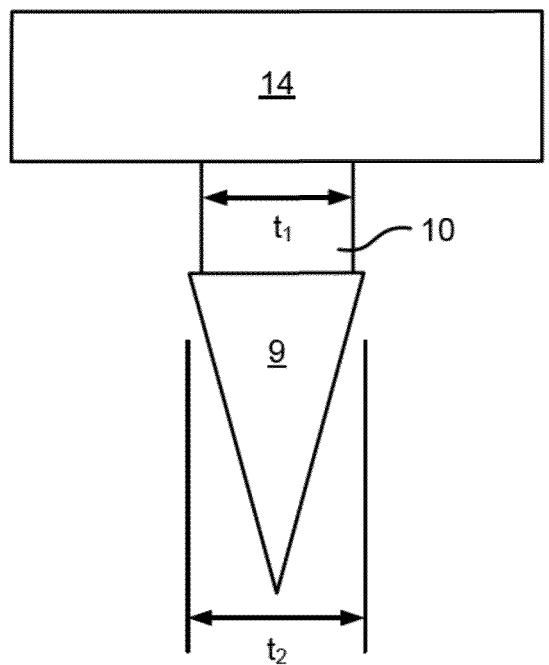
FIG. 6A shows a MAMR head formed with a properly aligned spin torque oscillator (STO).
Figure 6B:
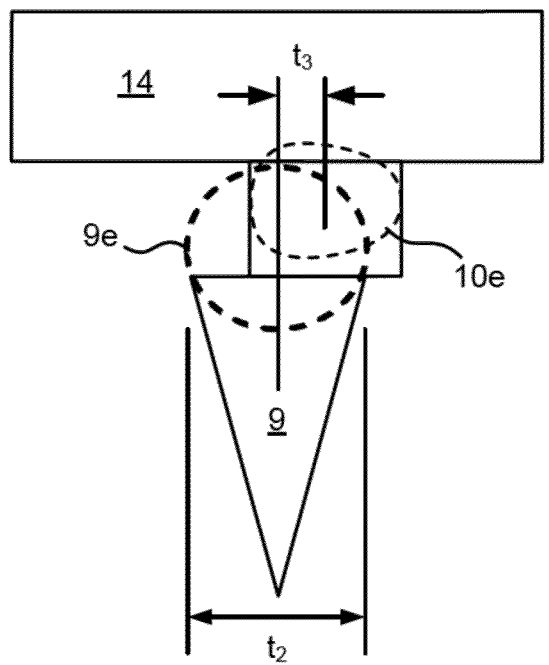
FIG. 6B shows a MAMR head with misalignment of the STO.

In a high-frequency magnetic field assisted recording head (e.g., a MAMR head), a high-frequency magnetic field generated by a STO and a writing magnetic field produced from a main pole overlap to record data on a magnetic medium, as shown in FIG. 6B. Because of the intensity distribution of the high-frequency magnetic field 10e and the writing magnetic field 9e, the width of the data recorded on the magnetic medium is affected by displacement $t_3$ from the center of the magnetic fields of both elements and, accordingly, the smaller this displacement $t_3$ is, the better recorded data is on the magnetic medium.

Figure 8A:
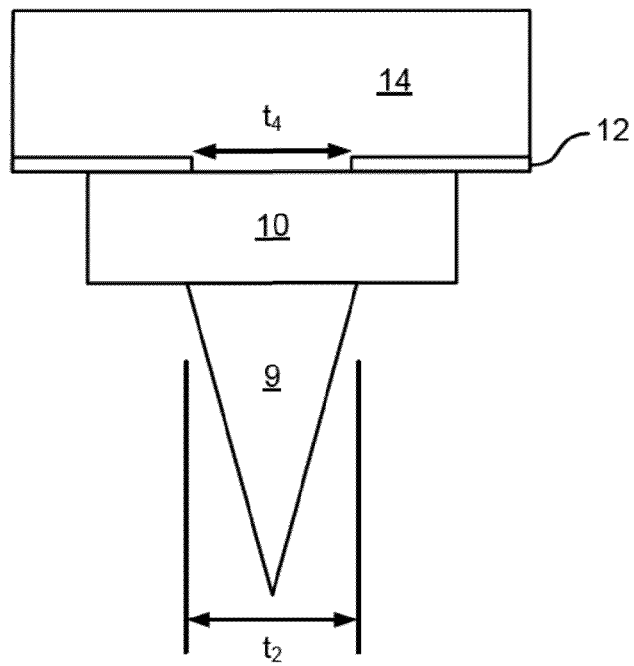
FIG. 8A shows a MAMR head formed with a properly aligned STO, according to one embodiment.

FIG. 8A shows a case in which a center of the STO 10 is aligned with a center of the main pole 9. In one approach, a voltage may be applied to the trailing shield 14 and the main pole 9, and the density distribution of the current flowing to the STO 10 may be calculated. The current density used for oscillation is on the order of $7 \times 10^7$ A/m$^2$ and this range is equivalent to the range at which a high-frequency magnetic field is generated. It is clear from this that, as shown in FIG. 8A, the width of the high-frequency magnetic field is equivalent to the width of the main pole 9 when an aperture width $t_4$ is almost the same as the width of the main pole 9. Furthermore, the oscillation range of the STO 10 may be controlled by the current confinement layer 12 (and aperture therethrough) in one approach.

Figure 8B:
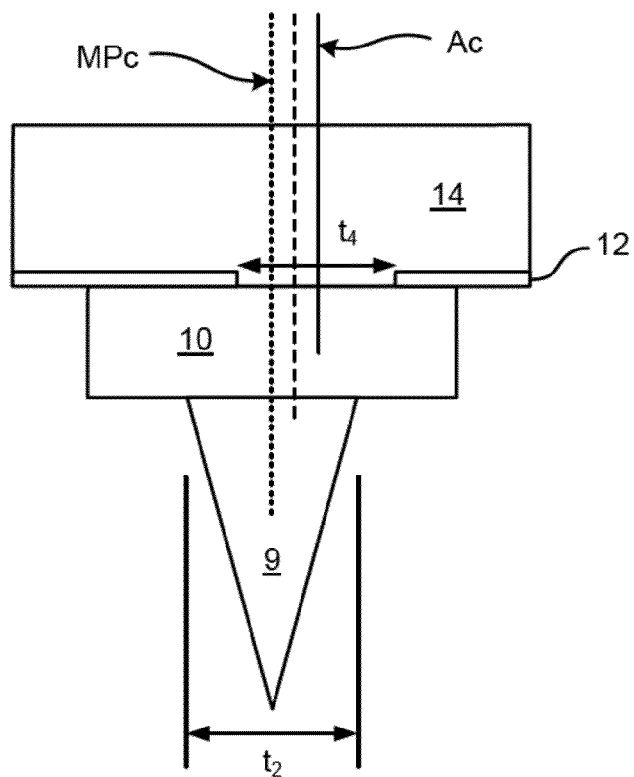
FIG. 8B shows a MAMR head formed with misalignment between the STO and the main pole, according to one embodiment.

However, as shown in FIG. 8B, because misalignment may be generated between the geometrical center MPc of the width of the main pole 9 and the geometrical center Ac of the aperture through the STO 10 when a STO 10 is actually produced on a main pole 9, variations in the recording width on the recording medium are produced. This will be described in more detail later.

A simulated current density distribution when a current confinement layer is provided was performed with the aim of resolving this problem. The STO was fabricated as a laminated film with the oscillation layer provided in proximity of the center of the oscillation device. The center of the oscillation region lied in between the center of the main pole and the center of a current conductive region of the current confinement layer.

Results from this experimentation shows that the misalignment amount between the recording magnetic field generated by the main pole and the high-frequency magnetic field generated by the current confinement layer was almost half the misalignment amount between the main pole and the current conductive region provided in the current confinement layer. In a conventional STO, which is smaller than the main pole, because the recording width on the magnetic medium is determined by the overlap of the high-frequency magnetic field generated by the STO and the writing magnetic field generated by the main pole, when the displacement amount between the center of the distribution of the high-frequency magnetic field and the writing magnetic field is greater, the recording width is narrower. In contrast to the misalignment amount in a conventional structure, in some embodiments, the misalignment amount between the STO and the main pole may be reduced by half. Accordingly, in some approaches, the inherent problem in the conventional art of variation in recording width between magnetic heads due to displacement between the main pole and the STO may be reduced significantly.

Notably, a MAMR head comprising a current confinement layer may be a simple structure configured from a STO, a main pole for generating a writing magnetic field, and a trailing shield. In addition to this, the MAMR head may be able to be adapted for options used in perpendicular recording systems which include side shields and leading edge taper, among other options known to those of skill in the art. In such instances, electrical connections between the main pole and the trailing shield at sections other than the STO (for example, the back gap) should be avoided unless extra STO leads are provided.

FIGS. 9A-9I show cross-sectional views of one example of a method for manufacturing a MAMR head as described herein according to various embodiments. The left of each figure shows a cross-section of the center of the MAMR head perpendicular to an ABS, and the right of each figure shows the media-facing surface (such as an ABS) thereof.

Figure 9A:
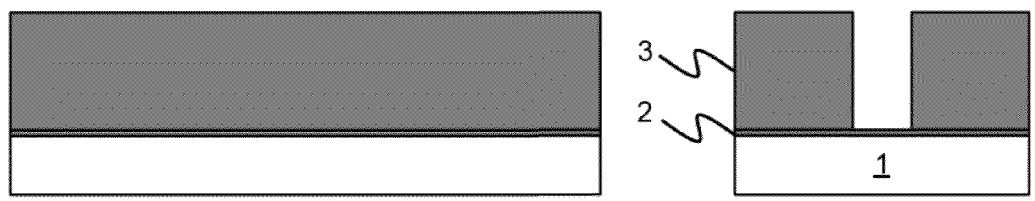

FIG. 9A shows the formation of a reactive ion etching (RIE) stopper film 2 and the fabrication of a resist pattern 3 on the surface of a substrate 1 having alumina formed on its surface for separating the read head and the write head. A sensor of the read head of the substrate 1 may be used to serve the function of reproducing the recording signal. In addition, the resist pattern 3 corresponds to the trench shape for the fabrication of the main pole.

Figure 9B:
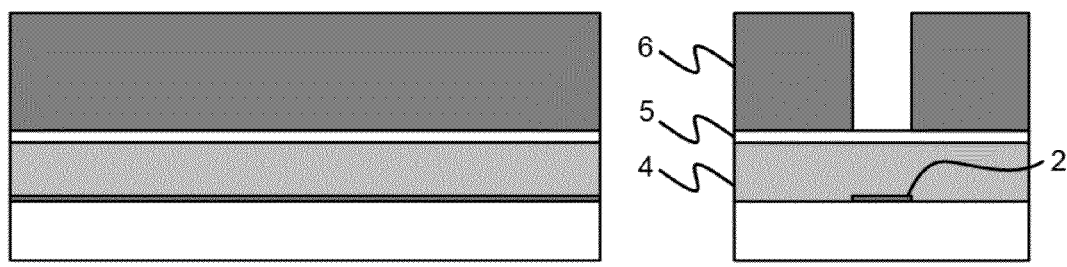

FIG. 9B shows, following patterning of the stopper film 2, such as by using Ar ion milling employing the resist pattern 3 as a mask, the fabrication of an alumina layer 4 and an RIB mask material 5 in sequence and, furthermore, the fabrication of a resist pattern 6 for forming the main pole. As the RIE stopper film 2 and the RIE mask material 5, a material having etching resistance, such as nickel-chrome (NiCr), chrome (Cr), or the like, may be employed. The resist pattern 6 may comprise any suitable material as would be known in the art.

Figure 9C:
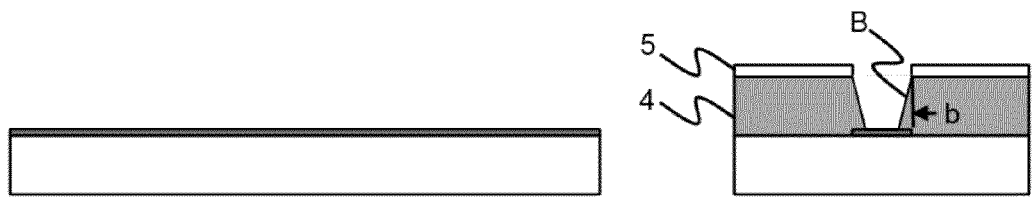

FIG. 9C shows milling, such as the Ar ion milling, of the RIE mask material 5 employing the resist pattern 6 as a mask and, furthermore, the etching of the alumina layer 4 by RIE employing the aforementioned RIE mask material 5. A bevel angle B is formed on the end face of the resist pattern 3, such as by RIE. This bevel angle B considers the skew angle during recording, and the angle b formed by the main pole on the ABS desirably may be not less than about 10°.

Figure 9D:
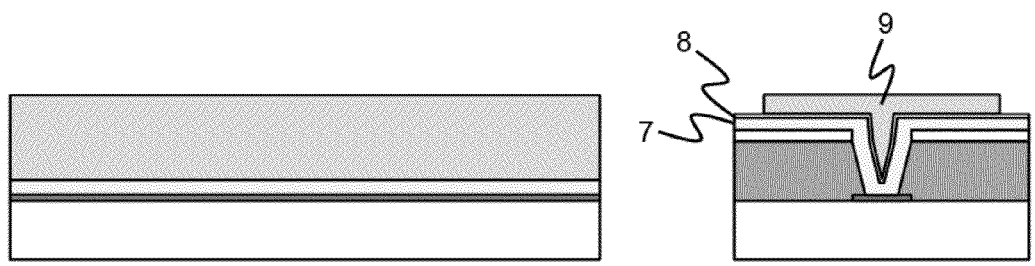

FIG. 9D shows the sequential fabrication of a non-magnetic layer 7 and a main pole plating seed layer 8 and, furthermore, the fabrication of the main pole 9 in the trench portion by frame plating employing a resist: As the non-magnetic layer 7, an insulation film of alumina or the like, or a low-resistance film of ruthenium (Ru), tantalum (Ta), chrome (Cr), nickel-chrome (NiCr), or laminated films thereof may be used. The employment of an insulation film (alumina) in this embodiment will be hereinafter described. In addition, the use of CoNiFe, CoFe, and/or FeNi in the main pole plating seed layer and the main pole may be desirable, in some approaches.

FIG. 9E shows the fabrication of a main pole 9 in an inverted triangular shape in a groove employing chemical mechanical polishing (CMP), or the like, and Ar ion milling, or the like.

FIG. 9F shows the fabrication of an oscillation device 10. The oscillation device 10 (such as a STO), following film formation, is fabricated by the implementation of processing in the track width direction and height direction in the same way as the process normally implemented for a read head.

Figure 10:
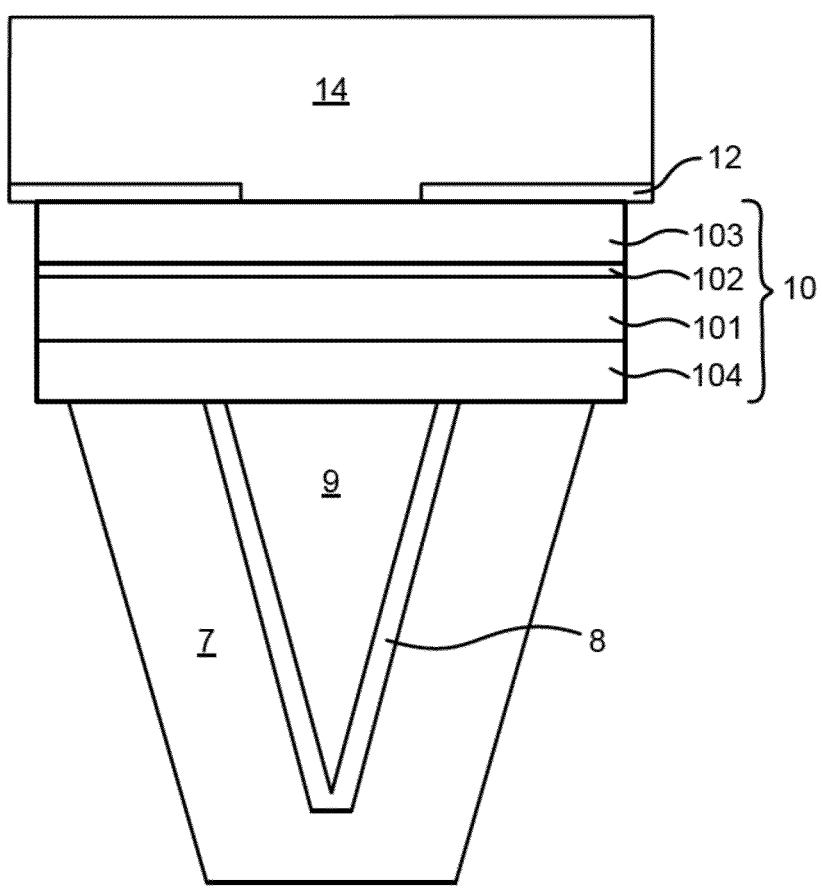
FIG. 10 shows a structure of a STO, according to one embodiment.
Figure 11:
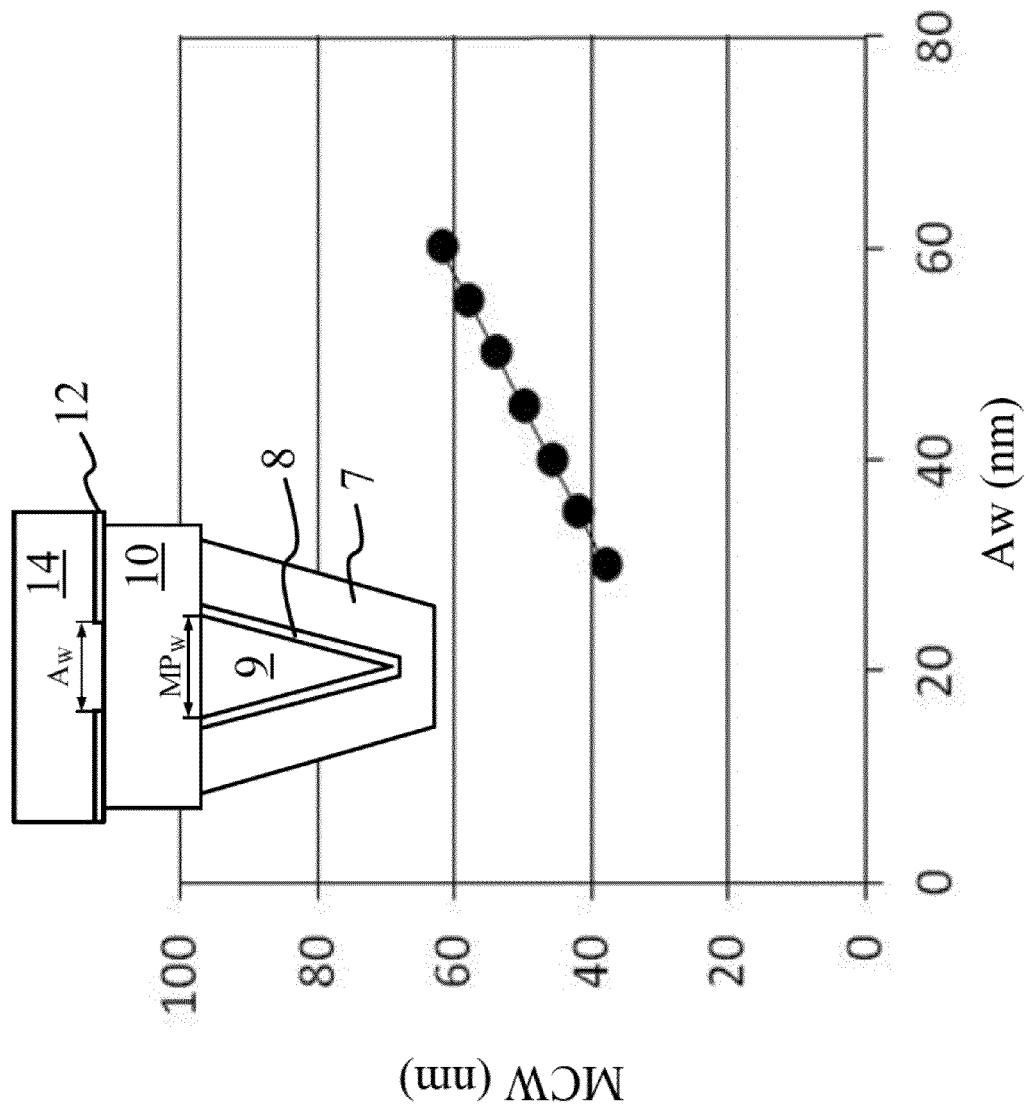
FIG. 11 shows a relationship between the current confined width ($A_w$) and the recorded width (MCW).

FIG. 10 shows the configuration of the oscillation device 10, in one embodiment. The oscillation device 10 comprises a field generation layer (FGL) 101 for generating a high-frequency magnetic field, an interlayer 102 comprising a material with long spin diffusion length, a spin injection fixed layer (polarization layer) 103 for imparting a spin torque to the FGL 101, and a rotation guide layer (layer with perpendicular anisotropy) 104 for stabilizing the rotation of magnetization in the FGL 101. The oscillation device 10 may be formed, as shown in FIG. 11, through lamination of the rotation guide layer 104, FGL 101, interlayer 102, and spin injection fixed layer 103 in this sequence from the main pole side or, in an alternate embodiment, lamination of the spin injection fixed layer 103, interlayer 102, FGL 101, and rotation guide layer 104 in this sequence from the main pole side. A high-frequency magnetic field is able to be produced from the main pole in the same way even when a fixed layer 103, interlayer 102, and FGL 101 are used.

FIG. 9G shows the fabrication of a resist pattern 11 above the oscillation device 10. This resist pattern 11 is used because it determines the position and the dimensions of the subsequently fabricated current confinement layer, in some approaches.

FIG. 9H shows, following Ar-ion milling or the like, using the resist pattern 11 as a mask and the further fabrication of an insulation material, the removal of the resist pattern 11. In this Ar-ion milling, for the purpose of etching the surface of the oscillation device 10, a low-resistance metal layer may be fabricated as a capping layer on the oscillation device 10. In addition, during the removal of the resist pattern 11, the insulation material fabricated on the resist pattern 11 is lifted off simultaneously with the removal of the resist pattern 11. The insulation material determines the region of the oscillation device 10 to which a current is applied and, accordingly, is hereinafter referred to as a current confinement layer 12. An aperture is provided in the current confinement layer 12, and the aperture may have any cross-sectional shape, such as rectangular, triangular, polygonal, etc., and is electrically connected to the subsequently fabricated trailing shield.

FIG. 9I shows the completion of the fabrication of the MAMR head. In the method of manufacturing implemented for subsequent processing steps, a method identical to that used for the manufacture of a conventional perpendicular recording head may be used, as would be understood by one of skill in the art. Employing a normal plating method, an auxiliary pole 13 and the trailing shield 14 may be fabricated and, furthermore, a coil 15, a coil insulation layer 16, and a sub-pole 17 may be fabricated.

In the MAMR head formed in the manner described above, data is formed as a result of the magnetic field produced by the coil 15, and this magnetic field generates a writing magnetic field by way of the magnetic circuit formed by the auxiliary pole 13, the main pole 9, a magnetic medium 10 opposing the plane A-A', the trailing shield 14, and the sub-pole 17. In addition, when an oscillation current (oscillation-drive current) sent from an exterior electrode using wires, vias, channels, etc., is applied to an electrical circuit linked to another exterior electrode by way of the sub-pole 17, the trailing shield 14, the oscillation device 10, the main pole 9, the auxiliary pole 13 and the wires, the oscillation device 10 generates a high-frequency magnetic field. During recording, the high-frequency magnetic field generated by the oscillation device 10 forms a region in close proximity to the magnetic medium 10 in which recording is able to occur more easily, and the writing magnetic field generated by the main pole 9 effects the writing of data to the magnetic medium 10.

Notably, while a structure in which the current is confined by the insulation material may be used, fundamentally, the specific resistance of the material of the current-constricting section provided in the region of the section in which the current flows should be higher than the specific resistance of the material forming the section in which the current flows provided on the main pole. Accordingly, the material of the current-constricting section is not necessarily an insulation material, and it may be a metal material or a composite of a metal material and an insulation material, according to various embodiments.

FIG. 11 shows a relationship between the width $A_w$ of the current confinement layer 12 fabricated between the oscillation device 10 and the trailing shield 14 and the magnetic core width (MCW) recorded on the recording medium which serves as the characterizing feature of some structures described herein. With the width $MP_W$ of the main pole 9 set at 45 nm, the MCW was examined using $A_w$ as a parameter. MCW was found to increase accompanying an increase in $A_w$. This is because the $A_w$ regulates the current density distribution flowing to the oscillation device 10, and oscillates only the region in which the current density used for oscillation is reached. At these MAMR head conditions, when the device width of the oscillation device 10 is about 120 nm and the $A_w$ is about 45 nm with respect to a 45 nm main pole width, the MCW is about 50 nm. Accordingly, it is clear that the oscillation amplitude produced by the oscillation device 10 is able to be restricted by the $A_w$, and that the width of the oscillation device 10 need not be formed smaller than the pole width of the main pole.

Figure 12:
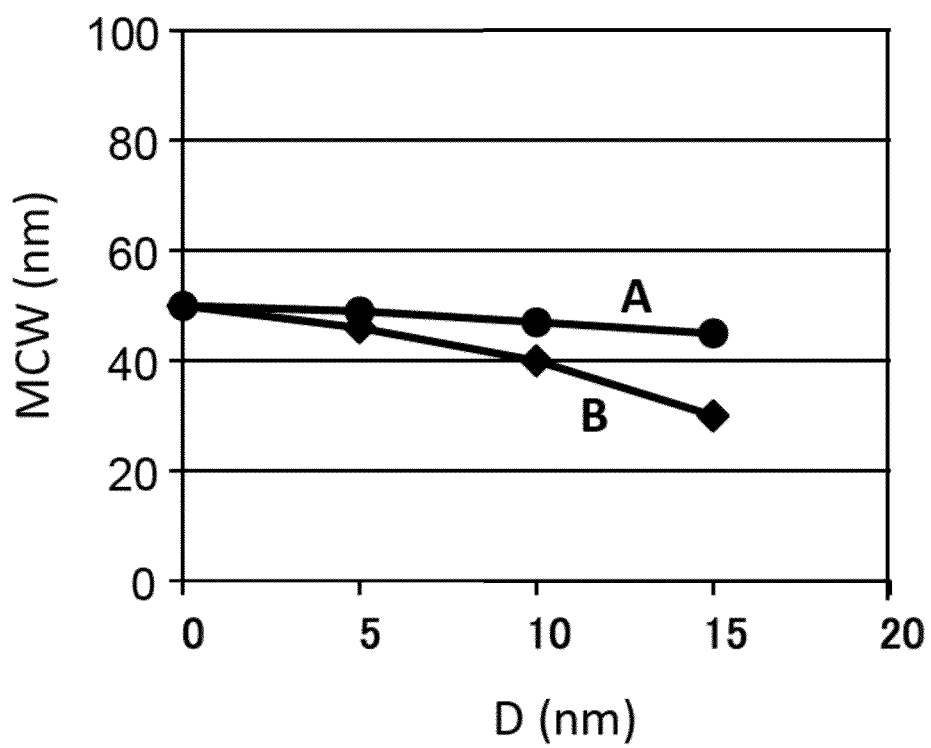
FIG. 12 shows a relationship between the pattern shift (D) caused by misalignment and the recorded width (MCW).

FIG. 12 shows the dependency of MCW on the alignment accuracy of the aperture position in the current confinement layer of the MAMR head. The horizontal axis denotes the misalignment amount (shift) D between the center of the main pole and the aperture of the current confinement layer, and the vertical axis denotes the MCW. In the diagram, the pole width of the main pole is set at about 45 nm, and A expresses the result obtained using embodiments described herein when the aperture width of the current confinement layer is about 45 nm, while B expresses the result obtained when about a 45 nm oscillation device is fabricated on the main pole without employing the current confinement layer. The gradient of line A is approximately half that of line B and, accordingly, even if the misalignment amount with the main pole were to increase, the change in MCW would be half as great as with conventional structures.

Referring again to FIG. 10, embodiments described herein allow for the fabrication of a magnetic head in which the effects attributable to alignment error between the main pole 9 and the STO 10 are able to be eliminated or significantly reduced, and the effects of alignment error between the main pole 9 and the current confinement layer 12 are reduced.

Figure 13A:
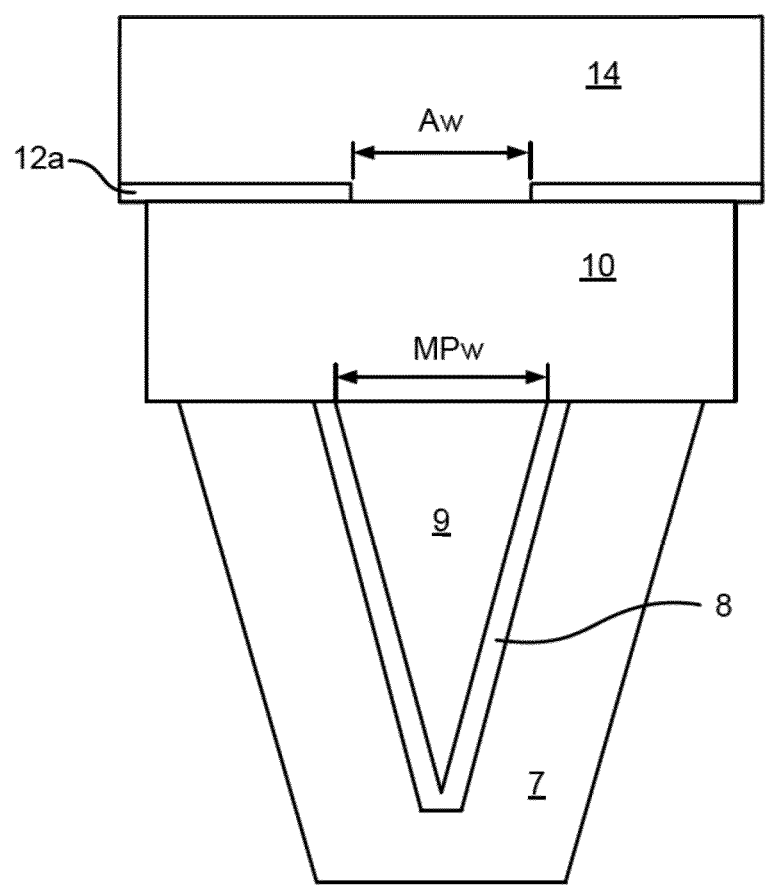
FIGS. 13A-13C show a MAMR head having at least one current confinement layer according to various embodiments.
Figure 13B:
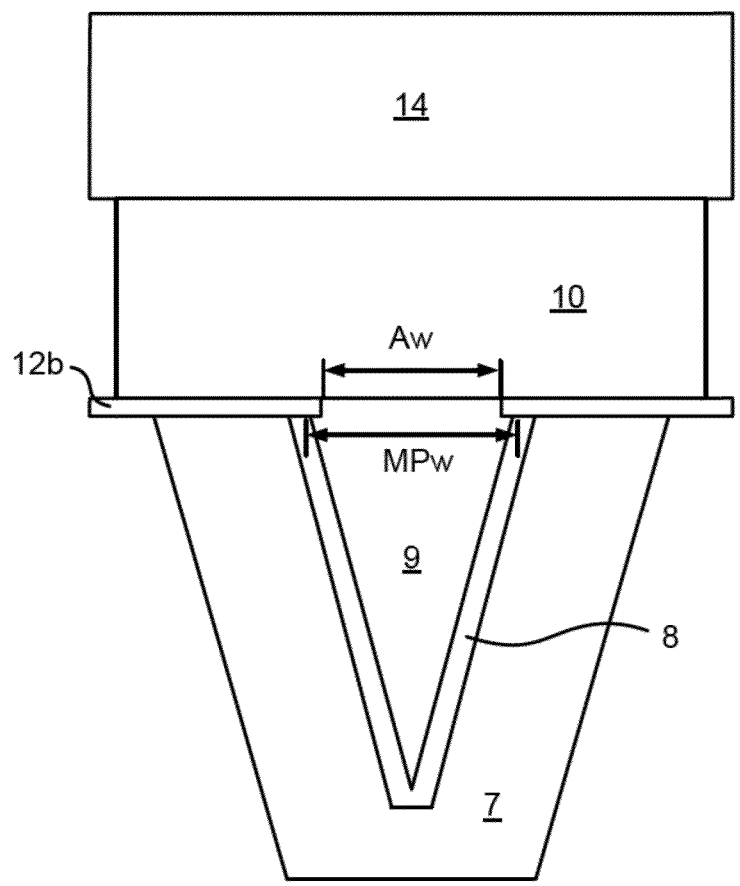
Figure 13C:
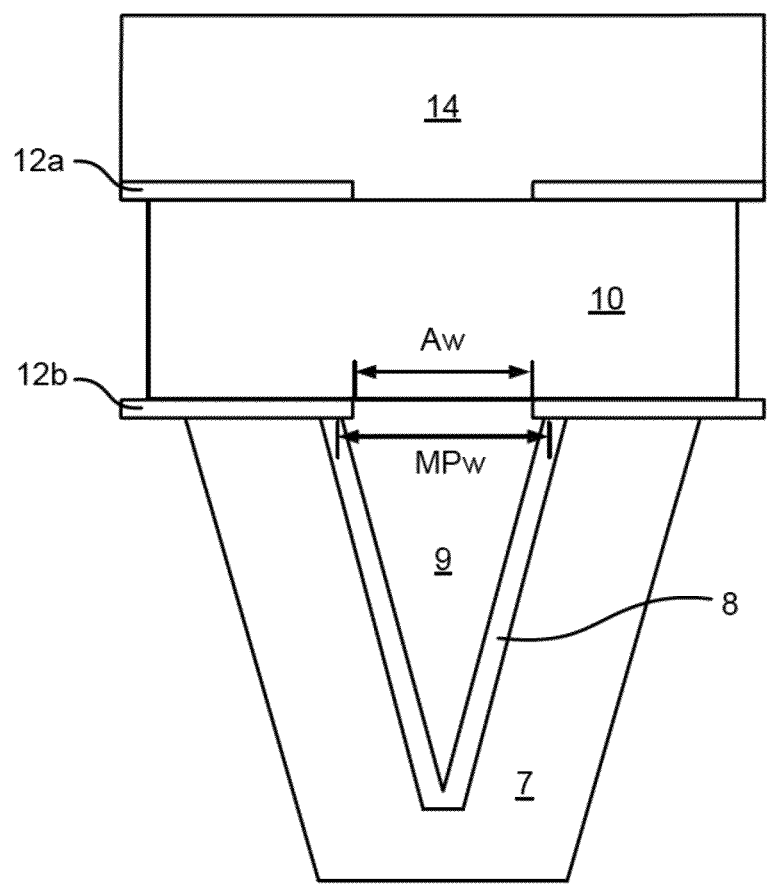

FIGS. 13A-13C show several configurations of the oscillator of the MAMR head, according to several embodiments. In the configuration of the MAMR head as shown in FIG. 13A, the oscillation device 10, the current confinement layer 12a, and the trailing shield 14 are provided in this order from the main pole 9 side. However, the main pole plating seed layer 8 and the non-magnetic layer 7 are provided in the side face of the main pole 9, and the pole at the main pole side of the STO 10 is the width of the non-magnetic layer 7. For this reason, even when a current confinement layer 12b is fabricated between the main pole 9 and the STO 10, as shown in FIG. 13B according to one embodiment, an identical effect to that produced by the embodiment described in FIG. 13A is produced. Furthermore, by arranging the current confinement layers 12a and 12b between the main pole 9 and the STO 10 and between the STO 10 and the trailing shield 14 to enclose the oscillation device 10 as shown in FIG. 13C, the desired effect is producible.

As shown in FIGS. 13A-13C, a MAMR head comprises a main pole 9 adapted for producing a writing magnetic field, a STO 10 positioned above the main pole 9, a low-resistance layer 14 positioned above the STO 10, and a current confinement layer 12a, 12b positioned between the low-resistance layer 14 and the main pole 9. The main pole 9 and the low-resistance layer 14 are adapted for acting as poles for writing data to a magnetic medium (not shown) in response to a flow of current to the STO 10 positioned therebetween to generate a high-frequency magnetic field which overlaps with the writing magnetic field. Also, the current confinement layer 12a, 12b is adapted for controlling a current density and/or a current density distribution of the current flowing to the STO 10.

In one embodiment, the MAMR head may include a trailing shield 14 that comprises the low-resistance layer, the trailing shield 14 being positioned on a trailing side of the main pole 9. In addition, as shown in FIG. 13A, the current confinement layer 12a may be positioned between the STO 10 and the trailing shield 14. An aperture in the current confinement layer 12a allows the STO 10 and the trailing shield 14 to be in electrical conduction with one another. In a further approach, a width of the aperture $A_w$ provided in the current confinement layer 12a in a track-width direction is narrower than a width of the STO 10 in the track-width direction. Furthermore, a width $MP_w$ of the main pole 9 in a track-width direction is at least as great as the width $A_w$ of the aperture provided in the current confinement layer 12a in the track-width direction.

In another embodiment, a width of the STO 10 in a track-width direction near a media-facing surface thereof may be greater than a width $MP_w$ of the main pole 9 in the track-width direction near a media-facing surface thereof.

According to one approach, a width $MP_w$ of the main pole 9 in a track-width direction near a media-facing surface thereof may be at least as great as a width of a current conductive region (as described in FIG. 8B) of the current confinement layer 12a, 12b in the track-width direction near a media-facing surface thereof.

Referring again to FIGS. 13A-13C, in another approach, a height of the current confinement layer 12a, 12b from the media-facing surface thereof may be less than a height of the trailing shield 14 from the media-facing surface thereof (as shown in FIG. 9I, in one approach).

Referring again to FIG. 13B, the current confinement layer 12b may be positioned between the main pole 9 and the STO 10. Furthermore, as shown in FIG. 13C, the MAMR head may further comprise a second current confinement layer 12a positioned between the low-resistance layer (trailing shield) 14 and the STO 10.

In another embodiment, any MAMR head structures as described herein according to various embodiments may be included in a magnetic data storage system. In one such implementation, the magnetic data storage system may include at least one MAMR head, a magnetic medium, a drive mechanism for passing the magnetic medium over the at least one MAMR head, and a controller electrically coupled to the at least one MAMR head for controlling operation of the at least one MAMR head.

As is described above, structures of MAMR heads according to various embodiments, because the need to fabricate a fine oscillation device on the main pole is eliminated through the introduction of the current confinement layer, and because the aperture of the current confinement layer has the effect of reducing alignment error, a magnetic head capable of high areal recording density and more uniform performances is able to be provided through a high-yield manufacturing process.

In one embodiment, a method may be used to form a MAMR head according to any embodiments described herein. This method may include forming a main pole 9, forming a current confinement layer 12b above the main pole 9, forming a STO 10 above the current confinement layer 12b, and forming a low-resistance layer 14 above the STO 10, as shown in FIG. 13B. Any formation techniques may be used, such as plating, deposition, sputtering, and other formation techniques known in the art. This method may further comprise forming a second current confinement layer 12a positioned above the STO 10, in one approach, as shown in FIG. 13C.

In another embodiment, as shown in FIG. 13A, a method for forming a MAMR head may include forming a main pole 9, forming a STO 10 above the main pole 9, forming a current confinement layer 12a above the STO 10, and forming a low-resistance layer 14 above the current confinement layer 12a. Any formation techniques may be used, such as plating, deposition, sputtering, and other formation techniques known in the art. This method may further comprise forming a second current confinement layer 12b positioned below the STO 10, in one approach, as shown in FIG. 13C.

Furthermore, in any embodiments described herein, a region of the current confinement layer 12a, 12b may more easily conduct current, such that current passes more easily through the confined region by the current confinement layer 12a, 12b than through other regions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A high-frequency magnetic field-assisted magnetic recording head, comprising:
   a main pole adapted for producing a writing magnetic field;
   a spin torque oscillator (STO) positioned above the main pole;
   a low-resistance layer positioned above the STO; and
   a current confinement layer positioned between the low-resistance layer and the main pole,
   wherein the main pole and the low-resistance layer are adapted for acting as poles for writing data to a magnetic medium in response to a flow of current to the STO positioned therebetween to generate a high-frequency magnetic field which overlaps with the writing magnetic field, and
   wherein the current confinement layer is adapted for controlling a current density and/or a current density distribution of the current flowing to the STO.

2. The head as recited in claim 1, further comprising a trailing shield that comprises the low-resistance layer, the trailing shield being positioned on a trailing side of the main pole.

3. The head as recited in claim 2, wherein the current confinement layer is positioned between the STO and the trailing shield, and wherein an aperture in the current confinement layer allows the STO and the trailing shield to be in contact with one another.

4. The head as recited in claim 3, wherein a width of the aperture provided in the current confinement layer in a track-width direction is narrower than a width of the STO in the track-width direction.

5. The head as recited in claim 4, wherein a width of the main pole in a track-width direction is at least as great as the width of the aperture provided in the current confinement layer in the track-width direction.

6. The head as recited in claim 1, wherein a height of the current confinement layer from the media-facing surface thereof is less than a height of the trailing shield from the media-facing surface thereof.

7. The head as recited in claim 1, wherein the current confinement layer is positioned between the main pole and the STO.

8. The head as recited in claim 7, further comprising a second current confinement layer positioned between the low-resistance layer and the STO.

9. The head as recited in claim 1, wherein the current confinement layer is positioned between the low-resistance layer and the STO.

10. The head as recited in claim 1, wherein a width of the STO in a track-width direction near a media-facing surface thereof is greater than a width of the main pole in the track-width direction near a media-facing surface thereof.

11. The head as recited in claim 1, wherein a width of the main pole in a track-width direction near a media-facing surface thereof is at least as great as a width of a current conductive region of the current confinement layer in the track-width direction near a media-facing surface thereof.

12. A magnetic data storage system, comprising:
    at least one head as recited in claim 1;
    a magnetic medium;
    a drive mechanism for passing the magnetic medium over the at least one head; and
    a controller electrically coupled to the at least one head for controlling operation of the at least one head.

13. A method, comprising:
    forming a main pole;
    forming a current confinement layer above the main pole;
    forming a spin torque oscillator (STO) above the current confinement layer; and
    forming a low-resistance layer above the STO in order to form the head as recited in claim 1.

14. The method as recited in claim 13, further comprising forming a second current confinement layer positioned above the STO.

15. A method, comprising:
    forming a main pole;
    forming a spin torque oscillator (STO) above the main pole;
    forming a current confinement layer above the STO; and
    forming a low-resistance layer above the current confinement layer in order to form the head as recited in claim 1.

16. A microwave-assisted magnetic recording (MAMR) head, comprising:
    a main pole adapted for producing a writing magnetic field;
    a spin torque oscillator (STO) positioned above the main pole;
    a trailing shield positioned above the STO, wherein the trailing shield comprises a low-resistance layer; and
    a current confinement layer positioned between the trailing shield and the main pole,
    wherein the main pole and the low-resistance layer of the trailing shield are adapted for acting as poles for writing data to a magnetic medium in response to a flow of current to the STO positioned therebetween to generate a high-frequency magnetic field which overlaps with the writing magnetic field, and
    wherein the current confinement layer is adapted for controlling a current density and/or a current density distribution of the current flowing to the STO.

17. The MAMR head as recited in claim 16, wherein the current confinement layer is positioned between the STO and the trailing shield, and wherein an aperture in the current confinement layer allows the STO and the trailing shield to be in contact with one another.

18. The MAMR head as recited in claim 17, wherein a width of the aperture provided in the current confinement layer in a track-width direction is narrower than a width of the STO in the track-width direction.

19. The MAMR head as recited in claim 17, wherein a width of the main pole in a track-width direction is at least as great as the width of the aperture provided in the current confinement layer in the track-width direction.

20. The MAMR head as recited in claim 16, wherein a height of the current confinement layer from the media-facing surface thereof is less than a height of the trailing shield from the media-facing surface thereof.

21. The MAMR head as recited in claim 16, wherein the current confinement layer is positioned between the main pole and the STO.

22. The MAMR head as recited in claim 16, wherein a width of the STO in a track-width direction near a media-facing surface thereof is greater than a width of the main pole in the track-width direction near a media-facing surface thereof.

\* \* \* \* \*

UNITED STATES PATENT AND TRADEMARK OFFICE
CERTIFICATE OF CORRECTION

PATENT NO. : 8,472,135 B1
APPLICATION NO. : 13/416784
DATED : June 25, 2013
INVENTOR(S) : Kusukawa et al.

Page 1 of 1

It is certified that error appears in the above-identified patent and that said Letters Patent is hereby corrected as shown below:

In the specification:

col. 8, line 37 replace "misaligmnent" with --misalignment--;

col. 9, line 14 replace "RIB" with --RIE--;

col. 9, line 32 replace "resist:" with --resist.--.

Signed and Sealed this
Twenty-fourth Day of September, 2013

Teresa Stanek Rea
*Deputy Director of the United States Patent and Trademark Office*